(12) United States Patent
Shrestha

(10) Patent No.: US 11,398,999 B1
(45) Date of Patent: Jul. 26, 2022

(54) SECURE AND SAFE CHILD SOCIAL NETWORKING AND PARENTAL OVERSIGHT SYSTEM AND A METHOD FOR ACCESSING AND USING THE SECURE AND SAFE CHILD SOCIAL NETWORKING AND PARENTAL OVERSIGHT SYSTEM BY PARENTS AND CHILDREN

(71) Applicant: Rohan Kumar Shrestha, Irving, TX (US)

(72) Inventor: Rohan Kumar Shrestha, Irving, TX (US)

(*) Notice: Subject to any disclaimer, the term of this patent is extended or adjusted under 35 U.S.C. 154(b) by 0 days.

(21) Appl. No.: 17/398,773

(22) Filed: Aug. 10, 2021

Related U.S. Application Data

(60) Provisional application No. 63/063,778, filed on Aug. 10, 2020.

(51) Int. Cl.
| | |
|---|---|
| *G06F 15/16* | (2006.01) |
| *H04L 51/212* | (2022.01) |
| *G08B 21/02* | (2006.01) |
| *H04W 64/00* | (2009.01) |
| *H04L 51/52* | (2022.01) |

(52) U.S. Cl.
CPC ........ *H04L 51/212* (2022.05); *G08B 21/0205* (2013.01); *G08B 21/0222* (2013.01); *H04L 51/52* (2022.05); *H04W 64/00* (2013.01)

(58) Field of Classification Search
CPC ....... H04L 51/12; H04L 51/32; H04L 51/212; H04L 51/52; G08B 21/0205; G08B 21/0222; H04W 64/00

USPC ................. 709/206, 203, 204, 223
See application file for complete search history.

(56) References Cited

U.S. PATENT DOCUMENTS

| | | | |
|---|---|---|---|
| 8,554,835 B1* | 10/2013 | Williams | H04L 51/32 709/203 |
| 2007/0208619 A1* | 9/2007 | Branam | H04N 7/17318 705/14.45 |
| 2009/0217342 A1* | 8/2009 | Nadler | G06F 21/40 726/1 |
| 2012/0192087 A1* | 7/2012 | Lemmey | H04L 65/80 715/753 |
| 2013/0219517 A1* | 8/2013 | Yerli | H04L 63/10 726/28 |
| 2014/0032564 A1* | 1/2014 | Sankar | G06F 16/328 707/741 |
| 2014/0207864 A1* | 7/2014 | Meena | H04L 67/306 709/204 |
| 2020/0213326 A1* | 7/2020 | Herman | H04L 51/32 |

* cited by examiner

*Primary Examiner* — Kaylee J Huang
(74) *Attorney, Agent, or Firm* — Plager Schack LLP; Mark H. Plager; Stephen Hallberg

(57) ABSTRACT

A software/mobile app-implemented secure and safe child social networking and parental oversight system and a software/mobile app-implemented method are disclosed which places an emphasis on providing the utmost security and safety features for parents to ensure safe and secure interactions between their children and others. In this way, the secure and safe child social networking and parental oversight system and the software/mobile app-implemented method bring about a vision of the future of kids' social networking in a way that ensures safety and security.

8 Claims, 10 Drawing Sheets

US 11,398,999 B1

SECURE AND SAFE CHILD SOCIAL NETWORKING AND PARENTAL OVERSIGHT SYSTEM AND A METHOD FOR ACCESSING AND USING THE SECURE AND SAFE CHILD SOCIAL NETWORKING AND PARENTAL OVERSIGHT SYSTEM BY PARENTS AND CHILDREN

CLAIM OF BENEFIT TO PRIOR APPLICATION

This application claims benefit to U.S. Provisional Patent Application 63/063,778, entitled "A SECURE AND SAFE SOCIAL NETWORKING SYSTEM FOR CHILDREN AND RESOURCE MANAGEMENT PLATFORM FOR PARENTS," filed Aug. 10, 2020. The U.S. Provisional Patent Application 63/063,778 is incorporated herein by reference.

BACKGROUND

Embodiments of the invention described in this specification relate generally to social media and resource management systems, and more particularly, to a secure and safe child social networking and parental oversight system and a software/mobile app-implemented method for accessing and using the secure and safe child social networking and parental oversight system by parents and children with utmost security and safety features for parents to ensure safe and secure interactions between their children and others.

Children often wish to connect with other children via mobile devices, computers, and other networked electronics (video games, etc.). However, the existing social networking platforms lack security and safety management features that allow parents to manage their kids' social networking usage and interactions with others, or phone call who may be from unknown persons.

Therefore, what is needed is a secure and safe social networking platform for children which includes resource management features for parents and in which a dual-login restriction ensures that access is only possible when there are two logins—one for parents and one for kids—so that children can interact with other children over a social networking space which is safe and secure and which provides parents with the utmost security and safety features for parents to ensure safe and secure interactions between their children and others.

BRIEF DESCRIPTION

A novel secure and safe child social networking and parental oversight system and method for accessing and using the secure and safe child social networking and parental oversight system by parents and children are disclosed. In some embodiments, the secure and safe child social networking and parental oversight system is a social networking system for children and a resource management and oversight platform for parents, with software/mobile app-implementations of the method for accessing and using the secure and safe child social networking and parental oversight system by parents and children. The secure and safe child social networking and parental oversight system and the software/mobile app-implemented method place an emphasis on providing the utmost security and safety features for parents to ensure safe and secure interactions between their children and others. In this way, the secure and safe child social networking and parental oversight system and the software/mobile app-implemented method for accessing and using the secure and safe child social networking and parental oversight system by parents and children brings about a vision of the future of social networking for children in a way that ensures safety and security for children according to the parents of those children.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1A:
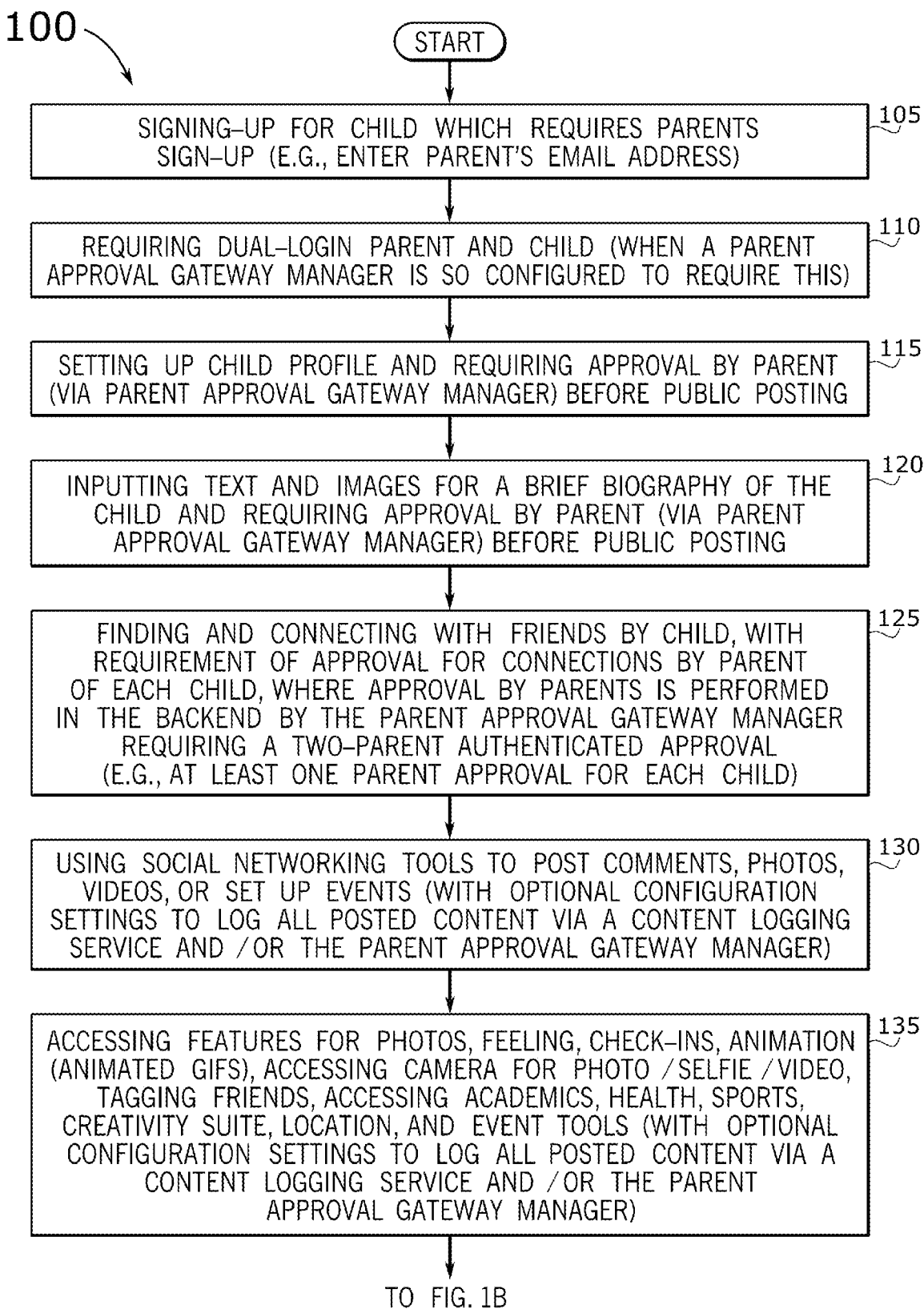
FIG. 1A conceptually illustrates a method for accessing and using a secure and safe child social networking and parental oversight system by parents and children in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a secure and safe child social networking and parental oversight system and a method for accessing and using the secure and safe child social networking and parental oversight system by parents and children. In some embodiments, the secure and safe child social networking and parental oversight system is a social networking system for children and a resource management and oversight platform for parents, with software/mobile app-implementations of the method for accessing and using the secure and safe child social networking and parental oversight system by parents and children. The secure and safe child social networking and parental oversight system and the software/mobile app-implemented method place an emphasis on providing the utmost security and safety features for parents to ensure safe and secure interactions between their children and others. In this way, the secure and safe child social networking and parental oversight system and the software/mobile app-implemented method for accessing and using the secure and safe child social networking and parental oversight system by parents and children brings about a vision of the future of social networking for children in a way that ensures safety and security for children according to the parents of those children.

As stated above, children often wish to connect with other children via mobile devices, computers, and other networked electronics (video games, etc.). However, the existing social networking platforms lack security and safety management features that allow parents to manage their kids' social networking usage and interactions with others, or phone call who may be from unknown persons. Embodiments of the secure and safe child social networking and parental oversight system and the software/mobile app-implemented method described in this specification solve such problems by providing the utmost security and safety features for parents to ensure safe and secure interactions between their children and others applies. The secure and safe child social networking and parental oversight system and the software/mobile app-implemented method apply this high level of secure access with parental oversight in several areas of child interest and parental concern including, without limitation, academics, health, vaccinations/medicine, sports, creativity, custom events, communications, security, and social connectivity with friends, etc., all in a secure network under parents control.

Embodiments of the secure and safe child social networking and parental oversight system and the software/mobile app-implemented method described in this specification differ from and improve upon currently existing options. In particular, some embodiments differ by requiring two separate logins-one for the child, another for the parent. In this way, the child is able to socially interact with other children who are known by the parent (or whose parents are known by the child's parent) while providing an executive level management of resources which the child is able to access and use, including phone, text, sharing photos, sharing screen, sharing video stream, etc. This ensures the safest platform for kids to connect and parents to manage resources under one platform to ensure safe and secure interactions between their children and others.

The secure and safe child social networking and parental oversight system and the software/mobile app-implemented method of the present disclosure may be comprised of the following elements. This list of possible constituent elements is intended to be exemplary only and it is not intended that this list be used to limit the secure and safe child social networking and parental oversight system and the software/mobile app-implemented method of the present application to just these elements. Persons having ordinary skill in the art relevant to the present disclosure may understand there to be equivalent elements that may be substituted within the present disclosure without changing the essential function or operation of the secure and safe child social networking and parental oversight system and method.

1. Sign-up for child and parent (e.g., enter parent's email address)
2. Require dual-login parent and child
3. Set up child profile, approval by parent
4. Find/connect with friends, approval required by parent of each child
5. Use social networking tools to post content or set up events
6. Access features for photos, feelings, check-ins, animations (animated GIFs), access camera for photo/selfie/video, tag friends, access academics, health, sports, creativity suite, location, and event tools.
7. Receive notifications, save items, view ongoing log of comments
8. Update or change settings (e.g., language, email, notifications, etc.)
9. Create events by parent for child in several areas: sports (e.g., require outdoor playtime for 60 minutes), academics, health, creativity events, location-based events, multi-user invite events (e.g., video chat for child's birthday in which friends are invited, etc.).
10. Approve/block phone calls between child and other user (by parent)

11. Add/remove photos, videos, or other content (by parent)

12. Track location of child (by parent)

13. Make, update, or change settings by parent with respect to child (e.g., toggle on/off settings for enable calls with friends, adding friends, messaging friends, creating events by child, inviting friends by child to events, posting by child, commenting by child, etc.)

The secure and safe child social networking and parental oversight system and the software/mobile app-implemented method of the present disclosure generally works by a software/mobile app implementation that connects to a cloud application service that hosts the secure and safe child social networking and parental oversight system and the software/mobile app-implemented method. The security and safety of the social networking system for children and resource management platform comes about via parental user functionality in which a parent user is able to watch kids activities from dashboard and approve and disapprove any activities for kids, able to record and upload (i) academic progress, (ii) health record(s), (iii) sports achievements, (iv) creativity, (v) location of child user (and connected friends), and (vi) for kids and see their daily progress. The security and safety of the social networking system for children and resource management platform also enables the parent user to be able to create events and invite user for kids social network like play day set up, share how the child user spent the day by uploading picture(s) from an event and sharing in the secure network. The security and safety of the social networking system for children and resource management platform also includes parental user functionality in which a parent user can see the child user's daily story on their dashboard and they can like share and comment on the daily post and achievement and parents can set up calendar reminder for important events for kids so they get notification for reminder.

Figure 1B:
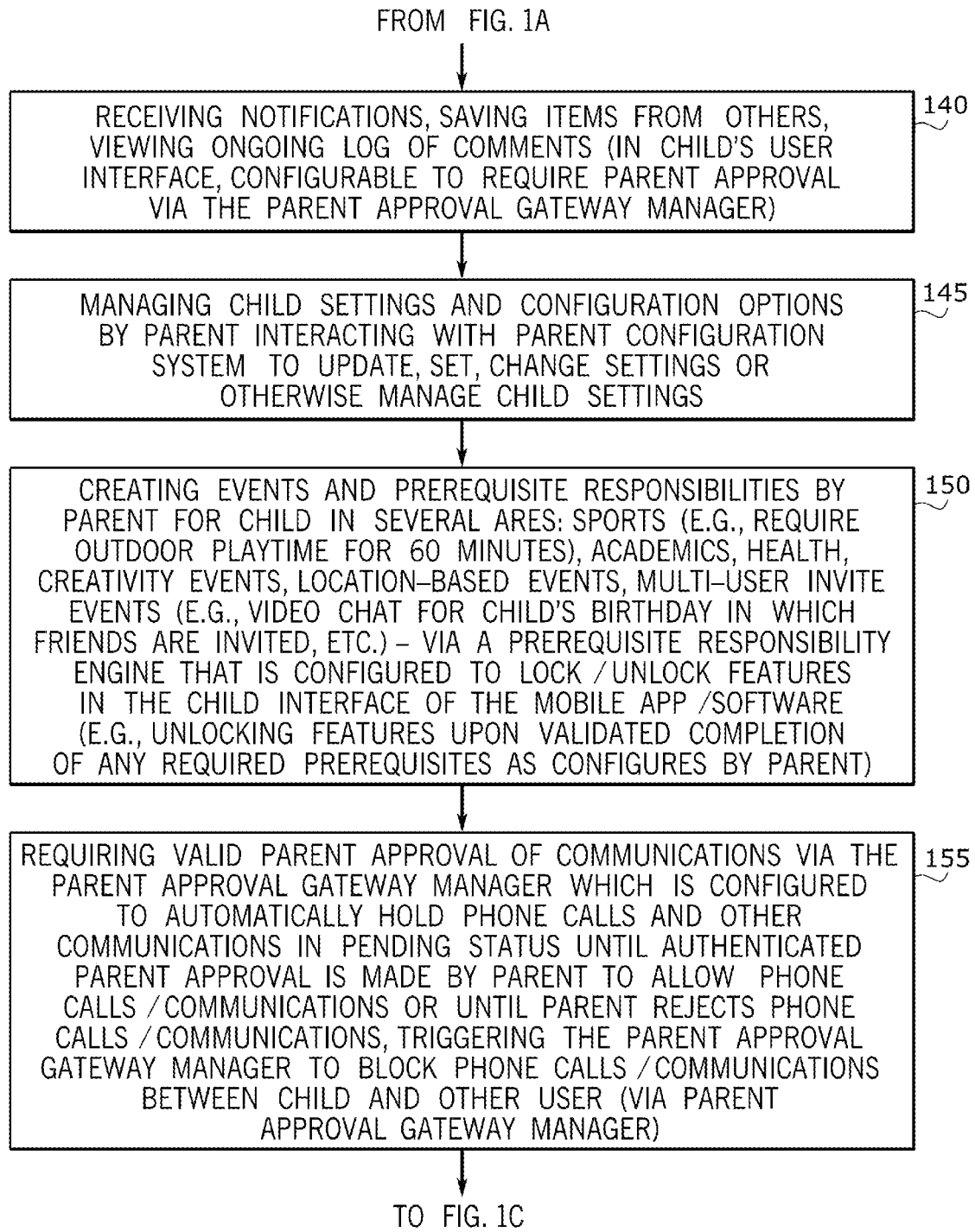
FIG. 1B conceptually illustrates a continuation of the method in FIG. 1A for accessing and using the secure and safe child social networking and parental oversight system by parents and children.
Figure 1C:
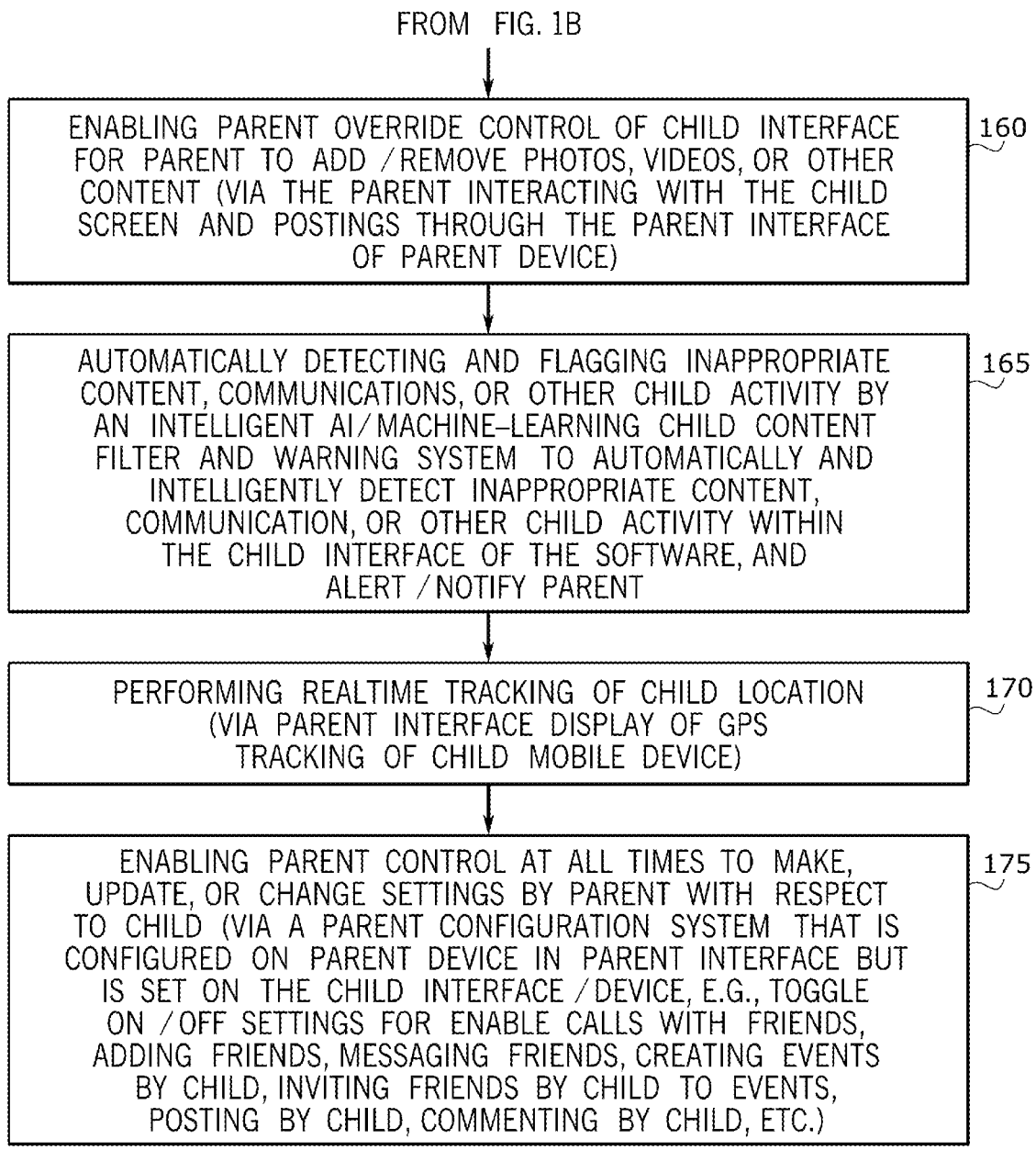
FIG. 1C conceptually illustrates a continuation of the method in FIG. 1B for accessing and using the secure and safe child social networking and parental oversight system by parents and children.

By way of example, FIGS. 1A-1C conceptually illustrate a method for accessing and using a secure and safe child social networking and parental oversight system by parents and children 100. In some embodiments, the method for accessing and using a secure and safe child social networking and parental oversight system by parents and children is performed by way of a user interacting with a secure and safe child social networking and parental oversight mobile app running on a mobile device. Examples of several user interface views are demonstrated for the secure and safe child social networking and parental oversight mobile app by reference to FIGS. 2-11. An example of a mobile device is also described below, by reference to FIG. 12. However, the secure and safe child social networking and parental oversight method could also be implemented as a web app that runs in a browser instance running on a general purpose computing device, a micro-computer, or any other electronic system. An example of an electronic system is described below, by reference to FIG. 13.

Turning first to FIG. 1A, the method for accessing and using a secure and safe child social networking and parental oversight system by parents and children 100 starts with signing-up for a child (at 105), which requires parental sign-up to authenticate, validate, and authorize the child sign-up. For example, the email address or mobile device number of a parent may be entered, which triggers an automatic email or message sent to the parent at the entered email address or mobile device number, with a link to authenticate and validate the request to sign-up the child. When the parent responds to the link, authorization of the child as a registered user of the system is made.

In some embodiments, the method for accessing and using a secure and safe child social networking and parental oversight system by parents and children 100 requires dual-login by parent and child (at 110). In some embodiments, the dual-login requirement is managed by a parent approval gateway manager unit of the secure and safe child social networking and parental oversight system by parents and children. Thus, when a registered child user logs into the system by way of the secure and safe child social networking and parental oversight mobile app, the parent approval gateway manager unit checks an active user account list to determine if the parent (or at least one parent, when multiple parents are connected to the child user) is logged onto the system or not. When the parent is not logged in, the parent approval gateway manager unit triggers an alert notification to be transmitted to the secure and safe child social networking and parental oversight mobile app running on a mobile device operated by the child user. The alert notification is presented in a way that informs the child that a parent needs to be simultaneously logged onto the system when the child logs in (e.g., a text notification indicating that a parent needs to be logged in).

In some embodiments, the method for accessing and using a secure and safe child social networking and parental oversight system by parents and children 100 includes a step for setting up a child profile (at 115) by child, after sign up is completed and the dual-login requirement is satisfied. Also, before the child add details in the child profile and post online for others to view, the child profile needs to be approved by the parent, which is enabled by and carried out to ensure compliance of the child getting parent approval via the parent approval gateway manager unit. Next, the method for accessing and using a secure and safe child social networking and parental oversight system by parents and children 100 includes a step for inputting biographical content about the child (at 120). The inputting performed by the child and/or parent and includes any of the following: textual information, image content, video content, other such creative content related to the child, etc., all provided within or in relation to a brief biography of the child (at 120). This also requires parent approval (at 120) before public posting of the content and information about the child.

In some embodiments, the method for accessing and using a secure and safe child social networking and parental oversight system by parents and children 100 moves forward to the next step, after the child biography is completed. Here, the child user can navigate through various options and user interfaces of the mobile app to perform various social networking activities. One such activity is finding and connecting with friends by the child (at 125). Again, parental approval is needed for making connects to others, and the approval needs to be from a parent of the requesting child as well as a parent from the friend. In some embodiments, parental approval is delegated to a backend process that accesses the parent approval gateway manager unit and requires two-parent authenticated approval. An example of a friend search and connect user interface view is described next, by reference to FIG. 2.

Figure 2:
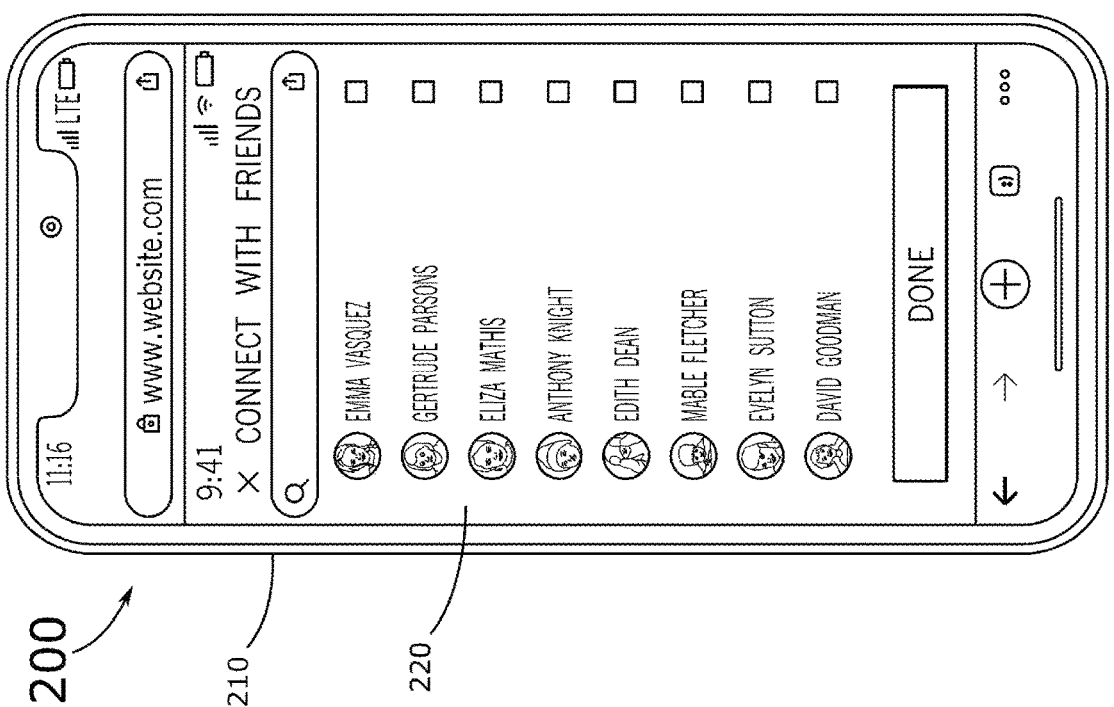
FIG. 2 conceptually illustrates a friend search and connect view of a mobile application ("mobile app") used to access the secure and safe child social networking and parental oversight system by children.

Specifically, FIG. 2 conceptually illustrates a friend search and connect user interface view 200 that is visually output onto a mobile screen (such as a touchscreen) of a mobile device 210 on which a secure and safe child social networking and parental oversight mobile app 220 is running. The secure and safe child social networking and parental oversight mobile app 220 is used to access the secure and safe child social networking and parental oversight system by children. From the friend search and connect user interface view 200, a child can search for friends and select friends from a list of possible friend connections. When selected, a parent of the selecting child would first need to approve the friend connection request, and even after the parent of the selecting child approves the request, the friend would need to accept the request, which itself would need parental approval from a parent of the friend. Then the child and the friend would be socially connected as friends in the secure and safe child social networking and parental oversight system.

Turning back to FIG. 1A, the method for accessing and using a secure and safe child social networking and parental oversight system by parents and children 100 of some embodiments continues forward to another step for using social networking tools to post content and/or set events (at 130). The content posted includes comments, photos, videos, and events include any such event, notably, academic, health, sports, creativity, location, or custom events. The child's profile can be configured in the settings by the parent to log all posted content and events by way of a content and event logging service, with or without requiring express approval via the parent approval gateway manager unit.

Next, the method for accessing and using a secure and safe child social networking and parental oversight system by parents and children 100 continues forward to another step for accessing features for photos, feeling(s), check-ins, animation (e.g., animated GIFs), accessing a camera of the mobile device for photos/selfies/videos, tagging friends, accessing academics, health, sports, creativity suite, location, and/or custom event tools (at 135), with optional configuration settings to log all posted content via a content logging service and/or the parent approval gateway manager unit via the backend processing (e.g., via the cloud application service).

Now turning to FIG. 1B, the method for accessing and using a secure and safe child social networking and parental oversight system by parents and children 100 continues to the next step of receiving notifications, saving items others, and viewing ongoing log(s) of comments (at 140), which is accomplished by way of the child's dashboard user interface and is configurable to require parent approval by way of the parent approval gateway manager. In some embodiments, the ability to save items of others depends on a set of content lock permissions and a configuration state of a copy authorization permission setting that a parent of the content-posting child can toggle on/off with respect to particular friend or other users or to all other users who are not their child. An example of a dashboard user interface view is described next, by reference to FIG. 3.

Figure 3:
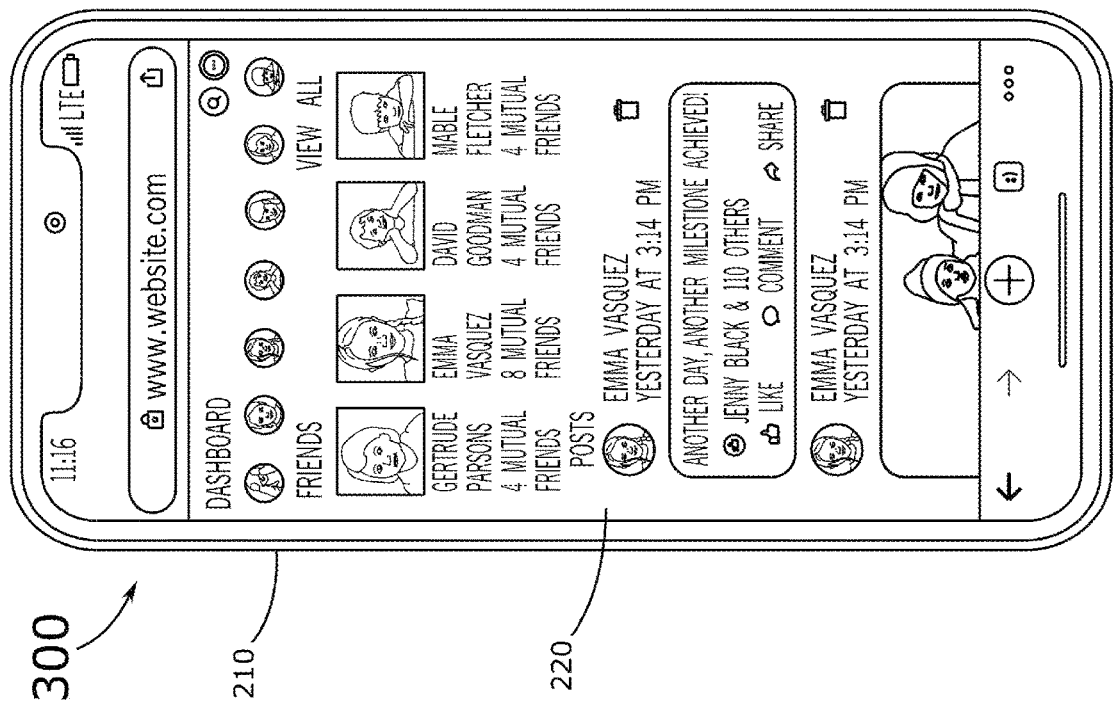
FIG. 3 conceptually illustrates a dashboard child user interface of the mobile app used to access the secure and safe child social networking and parental oversight system by children.

Specifically, FIG. 3 conceptually illustrates a dashboard child user interface 300 of the secure and safe child social networking and parental oversight mobile app 220 which is configured to run on the mobile device 210 to access the secure and safe child social networking and parental oversight system by children.

Turning back to FIG. 1B, the method for accessing and using a secure and safe child social networking and parental oversight system by parents and children 100 of some embodiments includes a step for managing child settings and configuration options by a parent interacting with a parent configuration system to update, set, or change settings or otherwise manage child settings (at 145). An example configuration and settings management interface for interacting with the parent configuration system is described next, by reference to FIG. 6.

Figure 6:
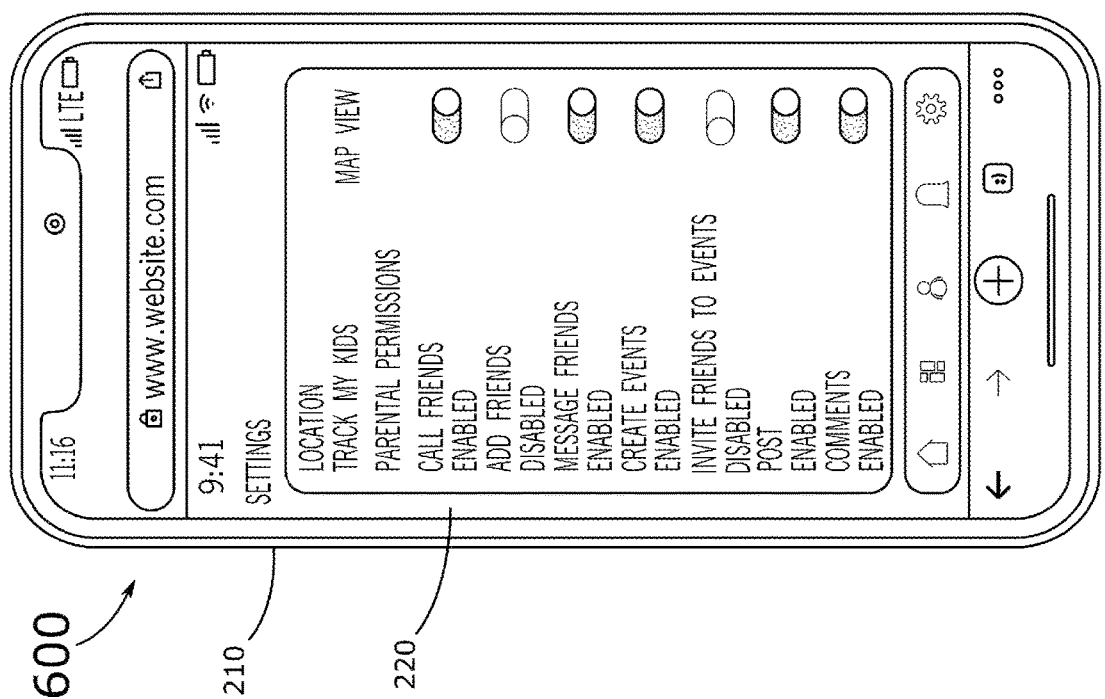
FIG. 6 conceptually illustrates a configuration and settings management interface of the mobile app used by the parent to manage and configure settings and permissions for accessing and using the secure and safe child social networking and parental oversight system by the related child.

Specifically, FIG. 6 conceptually illustrates a configuration and settings management interface 600 of the secure and safe child social networking and parental oversight mobile app 220 which, when running on the mobile device 210, is used by the parent to manage and configure settings and permissions for accessing and using the secure and safe child social networking and parental oversight system by the related child. As shown, the settings and permissions are easily toggled on/off, but in some cases, the configuration and settings management interface 600 employ other user interface tools to allow the parent to configure the settings and permissions with respect to their child.

Turning back to FIG. 1B, the method for accessing and using a secure and safe child social networking and parental oversight system by parents and children 100 includes a step for creating events and responsibilities by the parent for the child in several areas (at 150). Without limitation, the several areas include the following: sports (such as requiring outdoor playtime or active sports participation for sixty minutes per day or posting sports achievements of the child), academics (such as setting daily minimum reading requirements or posting academic achievements of the child), health, creativity events, location-based events, multi-user invite events (such as video chats with a group of friends), etc. In some embodiments, a prerequisite responsibility engine is configured to lock and unlock features, events, and/or options in the child user interface of the mobile app. This may also require validating the completion of any required responsibilities, as configured by the parent. An example child event and responsibility creation interface is described next, by reference to FIG. 8.

Figure 8:
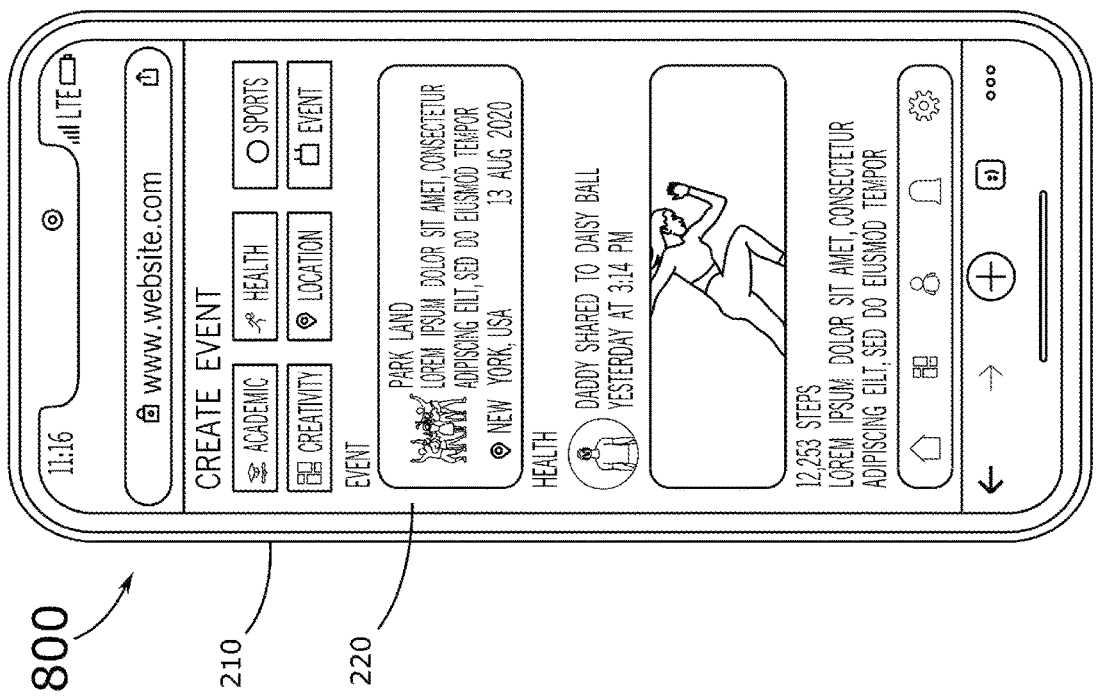
FIG. 8 conceptually illustrates a child event and responsibility creation interface of the mobile app used by the parent to create, configure, view, and cancel events and responsibilities with respect to the related child in any of several areas including at least academic, health, sports, creativity, location, and custom events.
Figure 11:
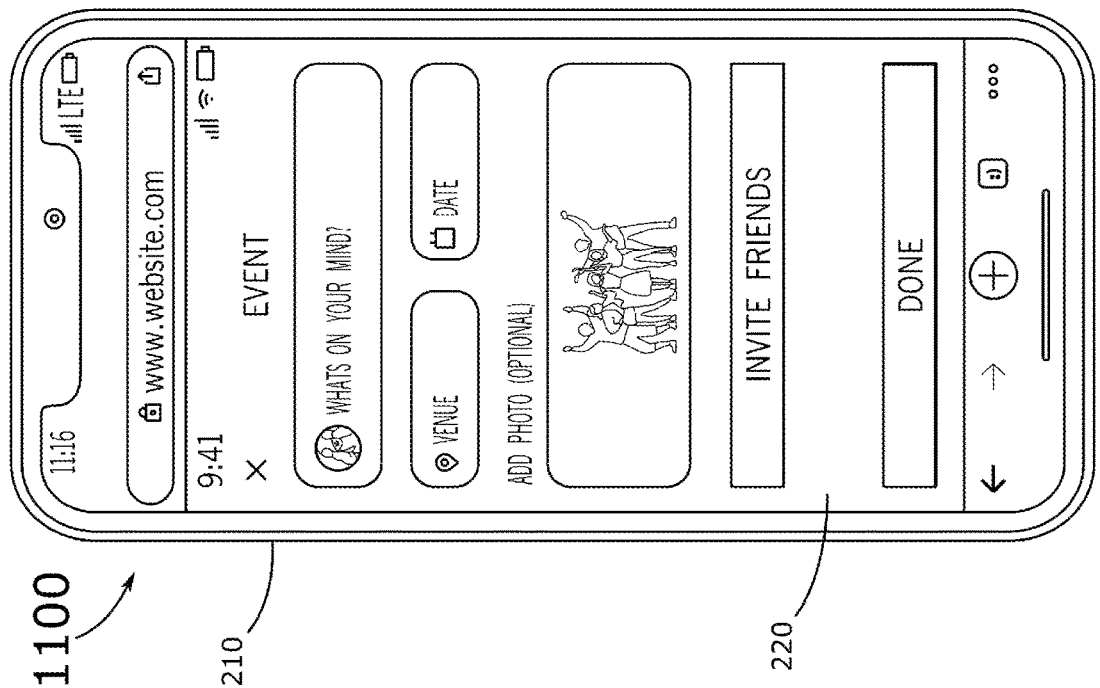
FIG. 11 conceptually illustrates a custom event creation interface of the mobile app used by the parent to create a particular event for the related child and invite other children to participate in the custom event.
Figure 10:
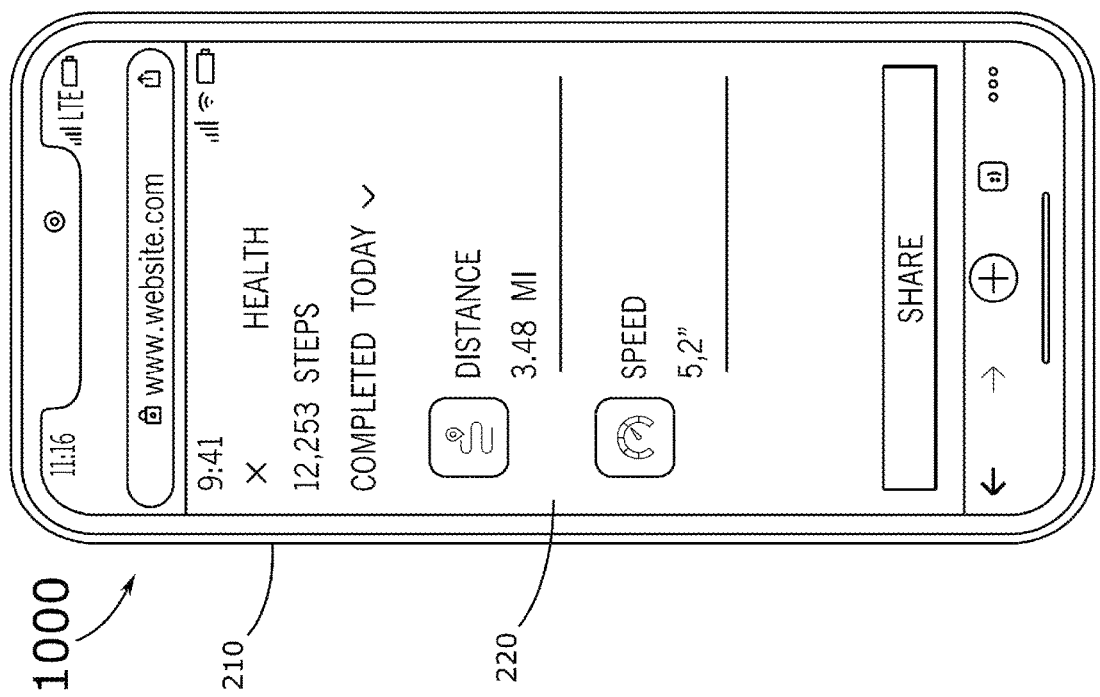
FIG. 10 conceptually illustrates a health event and responsibility publication interface of the mobile app used by the parent to publish, in a log of postings on a dashboard user interface of the related child, health data achieved by the related child in connection with a particular health event and responsibility of the related child.

Specifically, FIG. 8 conceptually illustrates a child event and responsibility creation interface 800 of the secure and safe child social networking and parental oversight mobile app 220 which, when running on the mobile device 210, is used by the parent to create, configure, view, and cancel events and responsibilities with respect to the related child in any of several areas including at least academic, health, sports, creativity, location, and custom events.

Figure 9:
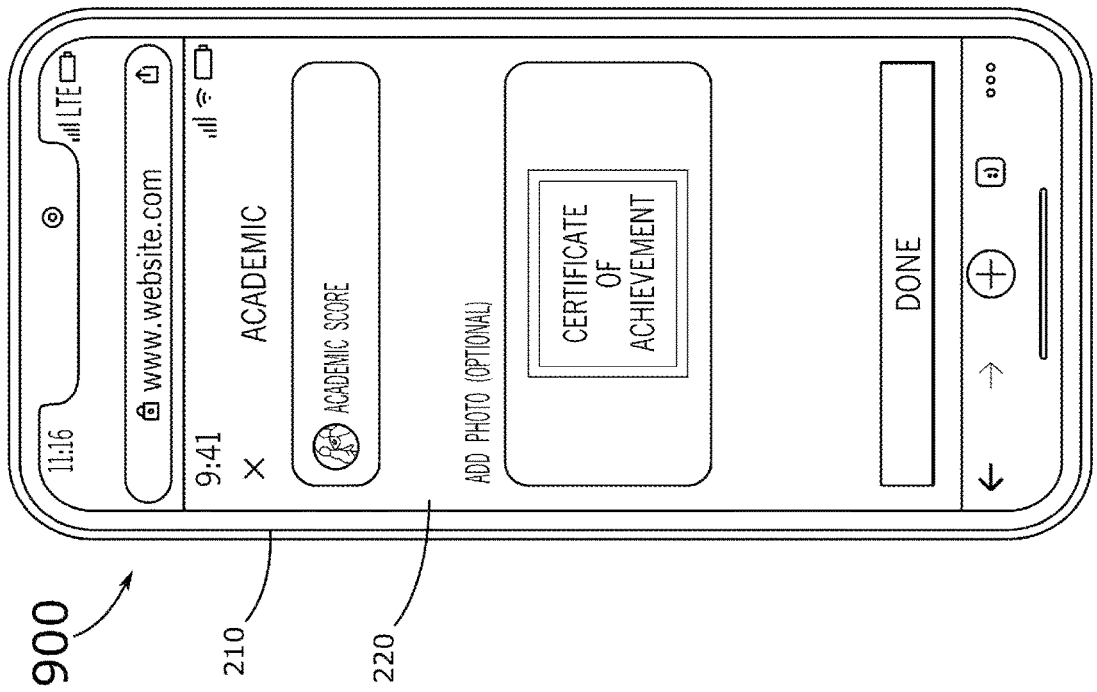
FIG. 9 conceptually illustrates an academic event and responsibility creation interface of the mobile app used by the parent to create an academic event.

Turning now to FIG. 9, an academic event and responsibility creation interface 900 of the secure and safe child social networking and parental oversight mobile app 220 is shown. When running on the mobile device 210, the secure and safe child social networking and parental oversight mobile app 220 is used by the parent to create an academic event. In another example, and by reference to FIG. 10, a health event and responsibility publication interface 1000 of the secure and safe child social networking and parental oversight mobile app 220 is shown. When running on the mobile device 210, the secure and safe child social networking and parental oversight mobile app 220 is used by the parent to publish, in a log of postings on a dashboard user interface of the related child, health data achieved by the related child in connection with a particular health event and responsibility of the related child. By way of yet another example, FIG. 11 conceptually illustrates a custom event creation interface 1100 of the secure and safe child social networking and parental oversight mobile app 220 which, when running on the mobile device 210, is used by the parent to create a particular event for the related child and invite other children to participate in the custom event.

Turning back to FIG. 1B, the method for accessing and using a secure and safe child social networking and parental oversight system by parents and children 100 continues forward with a step for requiring valid parent approval of communications (at 155) by way of the parent approval gateway manager unit which, when launched in the backend, is configured to automatically hold phone calls and other communications (text messages, inter app communication, dashboard log postings, etc.) in a pending status until authenticated parent approval is actuated by the parent to allow the phone calls or other communications, or contrarily, until the parent rejects phone calls or communications, thereby triggering the parent approval gateway manager unit to block phone calls or communications between the child and other users (at 155). An example parental approval gateway manager interface is described next, by reference to FIG. 5.

Figure 5:
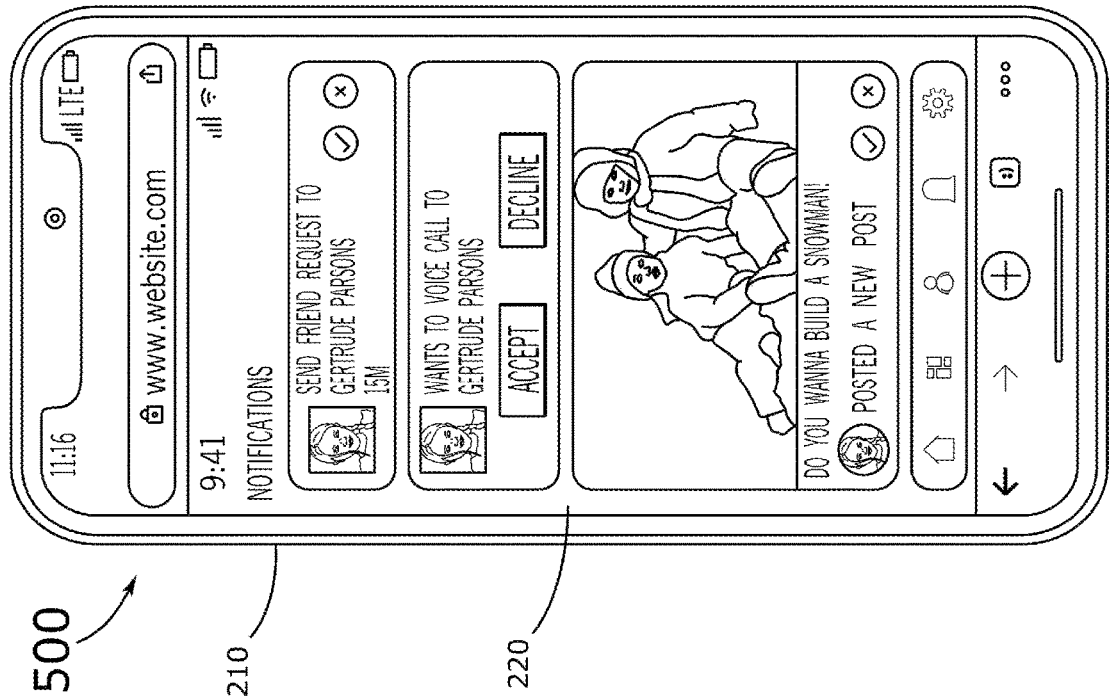
FIG. 5 conceptually illustrates a parental approval gateway manager interface of the mobile app used by the parent to authorize communication between the related child and other children accessing the secure and safe child social networking and parental oversight system.

Specifically, FIG. 5 conceptually illustrates a parental approval gateway manager interface 500 of the secure and safe child social networking and parental oversight mobile app 220 which, when running on the mobile device 210, is used by the parent to authorize communication between the related child and other children accessing the secure and safe child social networking and parental oversight system. As shown in the parental approval gateway manager interface 500, the parent can view notifications which, in this case, includes a notification that the child related to the parent user wants to make a voice call communication to another child user (presumably a connected friend, but not necessarily). The parental approval gateway manager interface 500 automatically generates accept and decline user interface buttons that are linked to underlying processes for accepting the calls to be made or, on the other hand, declining the ability of the related child to make the voice call. Similar user interface buttons/tools are generated in realtime and on the fly in connection with any other call or other communication notifications, thereby ensuring that the parent is able to perform oversight and/or control the ability to communicate with other children through the secure and safe child social networking and parental oversight mobile app 220.

Now turning to FIG. 1C, the method for accessing and using a secure and safe child social networking and parental oversight system by parents and children 100 continues to the next step of enabling parent override control of the child user interface for the parent to add/remove content (such as images, photos, videos, or other content) by the parent interacting with the child screen and postings through the parent interface of the parent mobile device (at 160). An example parental override user interface is described next, by reference to FIG. 4.

Figure 4:
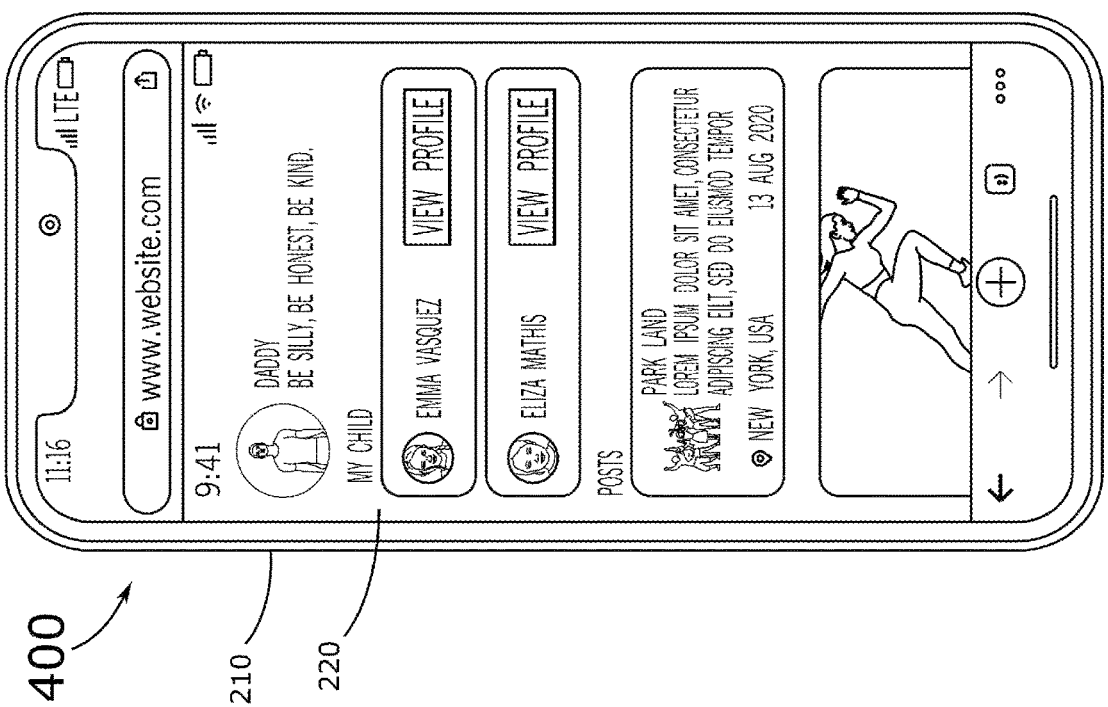
FIG. 4 conceptually illustrates a parental override user interface of the mobile app used by a parent to oversee and manage resources of a related child accessing the secure and safe child social networking and parental oversight system.

Specifically, FIG. 4 conceptually illustrates a parental override user interface 400 of the secure and safe child social networking and parental oversight mobile app 220 which, when running on the mobile device 210, is used by a parent to oversee and manage resources of a related child accessing the secure and safe child social networking and parental oversight system.

Now referring back to FIG. 1C, the method for accessing and using a secure and safe child social networking and parental oversight system by parents and children 100 proceeds to a step for automatically detecting and flagging inappropriate content, communications, or other child activity by an intelligent AI/machine-learning child content filter and warning system. In some embodiments, the intelligent AI/machine-learning child content filter and warning system executes in the backend (such as in connection with the cloud application service or other system processes) to automatically and intelligently detect inappropriate content, communications, or other child activity within the child user interface, dashboard, or other user interface views of the secure and safe child social networking and parental oversight mobile app 220, and, upon detecting such inappropriateness, to alert and notify the parent user associated with the child.

Next, the method for accessing and using a secure and safe child social networking and parental oversight system by parents and children 100 of some embodiments includes a step for performing realtime tracking of child location (at 170) by way of a parent interface map view display of GPS tracking of the mobile device of the child. In some embodiments, instead of a map view display, the GPS tracking of the child's mobile device is presented as GPS coordinates. An example realtime child location tracking map view is described next, by reference to FIG. 7.

Figure 7:
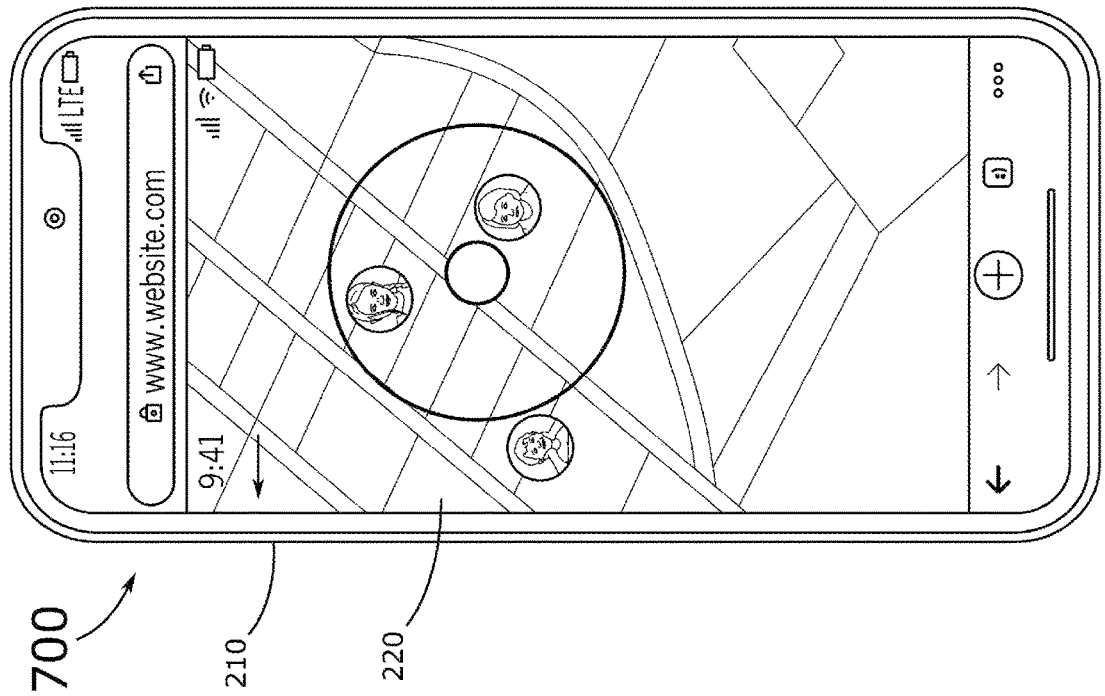
FIG. 7 conceptually illustrates a realtime child location tracking map view of the mobile app used by the parent to track the location of the related child and other nearby children who are connected as friends to the related child by way of the secure and safe child social networking and parental oversight system.

Specifically, FIG. 7 conceptually illustrates a realtime child location tracking map view 700 of the secure and safe child social networking and parental oversight mobile app 220 which, when running on the mobile device 210, is used by the parent to track the location of the related child and other nearby children who are connected as friends to the related child by way of the secure and safe child social networking and parental oversight system.

In some embodiments, the method for accessing and using a secure and safe child social networking and parental oversight system by parents and children 100 overall ensures that the steps include enabling parent control at all times to make, update, or change settings by the parent with respect to a related child (at 175). In some embodiments, this is accomplished by way of the parent configuration system which is configured on the parent's mobile device (or other computing device) and in the parent user interface but is set on the child user interface on the child mobile device. For instance, the parent can toggle a user interface tool to turn settings on/off to enable/reject calls with friends, adding friends to connection network, messaging friends, creating events and inviting others to the event by the child, posting content by the child, commenting by the child, etc.

The security and safety of the social networking system for children and resource management platform allows child users to create their profile and a biography, send friend requests, chat with connected friends, and engage in video calls after parents approve for each child, upload daily events, pictures, videos, and text-based stories, where the parents and friends can see their activities also they can tag siblings, engage in fun brain activities for kids, send notifications to parents by sending them a message like "I miss you" or an emoji, as well as other basic common updates so parents can see on the mobile app.

In some embodiments, to ensure utmost security, all data, images, videos, events, communications, connections, and any other content is secured by a set of content lock permissions that apply to all reviewing users. The content lock permissions ensures that no content posted by any user can be duplicated or copied, unless the parent for the child posting the content permits copying or duplication (otherwise known as content sharing) by setting a copy authorization permission setting to apply to specific other users (other parents or other children), or by default for any reviewing user. In some embodiments, all information and content related to any child user or parent user is automatically encrypted to prevent unauthorized viewing by other users who are not connected to the child or parent. The encryption of child and parent user information and all content postings, including logged content, is automatically handled by the mobile app and related cloud application service by way of one or more highly secure encryption protocols. In this manner, all user information and content is encrypted prior to internal storage on the mobile device and prior to any storage in the cloud (e.g., in a cloud database accessible via the mobile app in connection with the cloud application service, as hosted by a cloud server of the secure and safe child social networking and parental oversight system). The encryption protocol program (or code) that implements the highly secure encryption standard employs a user password and connection network identifier (ID) combination as an encryption key. In this way, any friend user who is a network connection of another child user can view content postings on the dashboard of the child user by simply accessing the dashboard view of the child user when the friend user is running the mobile app. Examples of highly secure encryption standards include, without limitation, SHA256, SHA512, SHA-3, AES-256, AES-512, etc.

Figure 12:
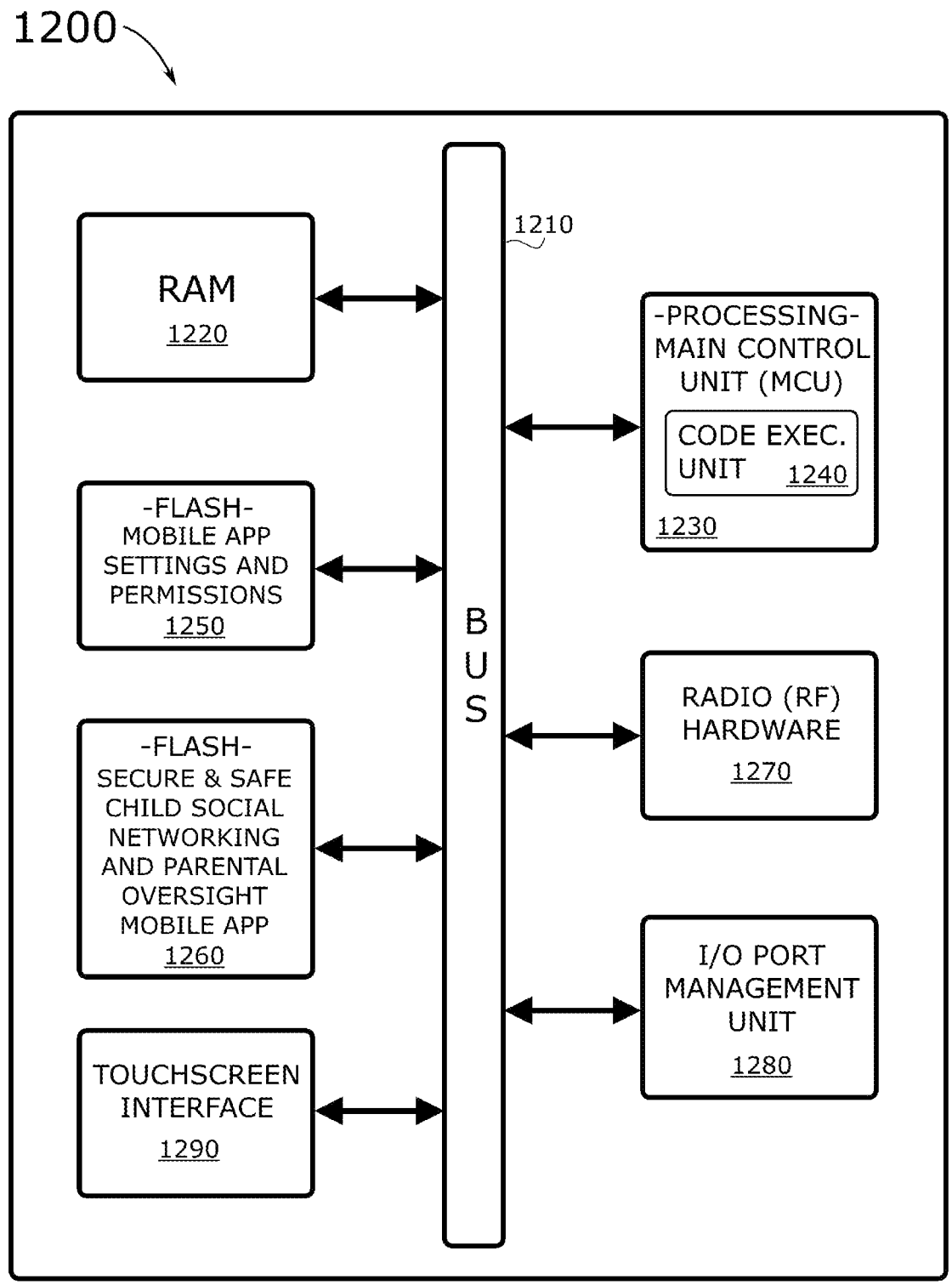
FIG. 12 conceptually illustrates a block diagram of a mobile device used to access and interact with the secure and safe child social networking and parental oversight system by parents and children in some embodiments.

By way of example, FIG. 12 conceptually illustrates a block diagram of a mobile device 1200 used to access and interact with the secure and safe child social networking and parental oversight system by parents and children. As shown in this figure, the mobile device 1200 includes a bus 1210, a random access memory (RAM) 1220, a main control unit (MCU) 1230 for runtime processing of a secure and safe child social networking and parental oversight mobile app running on the mobile device 1200, a code execution unit 1240 embedded within the MCU 1230, a first persistent flash memory 1250 that stores mobile app setting and permissions 1250 as configured by a parent with respect to a child user, a second persistent flash memory 1260 that stores the secure and safe child social networking and parental oversight mobile app as well as content postings, logs, dashboard data and information, events, communications, images, videos, embedded encryption protocol code, content lock permissions, and copy authorization permissions. The secure and safe child social networking and parental oversight mobile app and the several user interfaces for interacting with the secure and safe child social networking and parental oversight mobile app, as well as the embedded encryption code and all permissions are loaded into the RAM 1220 and executed by the code execution unit 1240 of the MCU 1230 to provide user access and interaction with the system and other users, and to automatically encrypt all information, data, user postings, content, etc., prior to internal storage on the mobile device 1200 and prior to any network transfer of data access wired or wireless networks to the cloud application service for storage in the cloud database in connection with the cloud server running as a unit of the secure and safe child social networking and parental oversight system. The code execution unit 1240 also decrypts all such information, data, and content when access is made by way of the secure and safe child social networking and parental oversight mobile app running on the mobile device 1200, whether the information, data, or content access is made by a first user on a first mobile device accessing the information, data, or content of a second user on a second mobile device, by way of the cloud application service, when both the first user and the second user are connected as friends in the secure and safe child social networking and parental oversight system and have sufficient content viewing permissions to access and view the information, data, or content. In this way, when the information, data, or content is retrieved from the internal storage of the mobile device 1200 or from the cloud database by way of the cloud application server, the code execution unit 1240 of the MCU 1230 can render said information, data, and content in a visually acceptable manner for output to the touchscreen interface 1290 of the mobile device 1200, or to another output device, such as a Bluetooth or WiFi connected display screen (e.g., an LCD display screen, an OLED display screen, etc.) via the radio (RF) hardware 1270 for transmission of such rendered information, data, and content, and also for transmission of information, data, and content to a wireless access point that is nearby and connected to a wider network, such as the Internet, with connection to the cloud application service, or via the input/output (I/O) management unit 1280 to local connection transmission over the network (Internet) or otherwise.

In this specification, the term "software" is meant to include firmware residing in read-only memory or applications stored in magnetic storage, which can be read into memory for processing by a processor. Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

Figure 13:
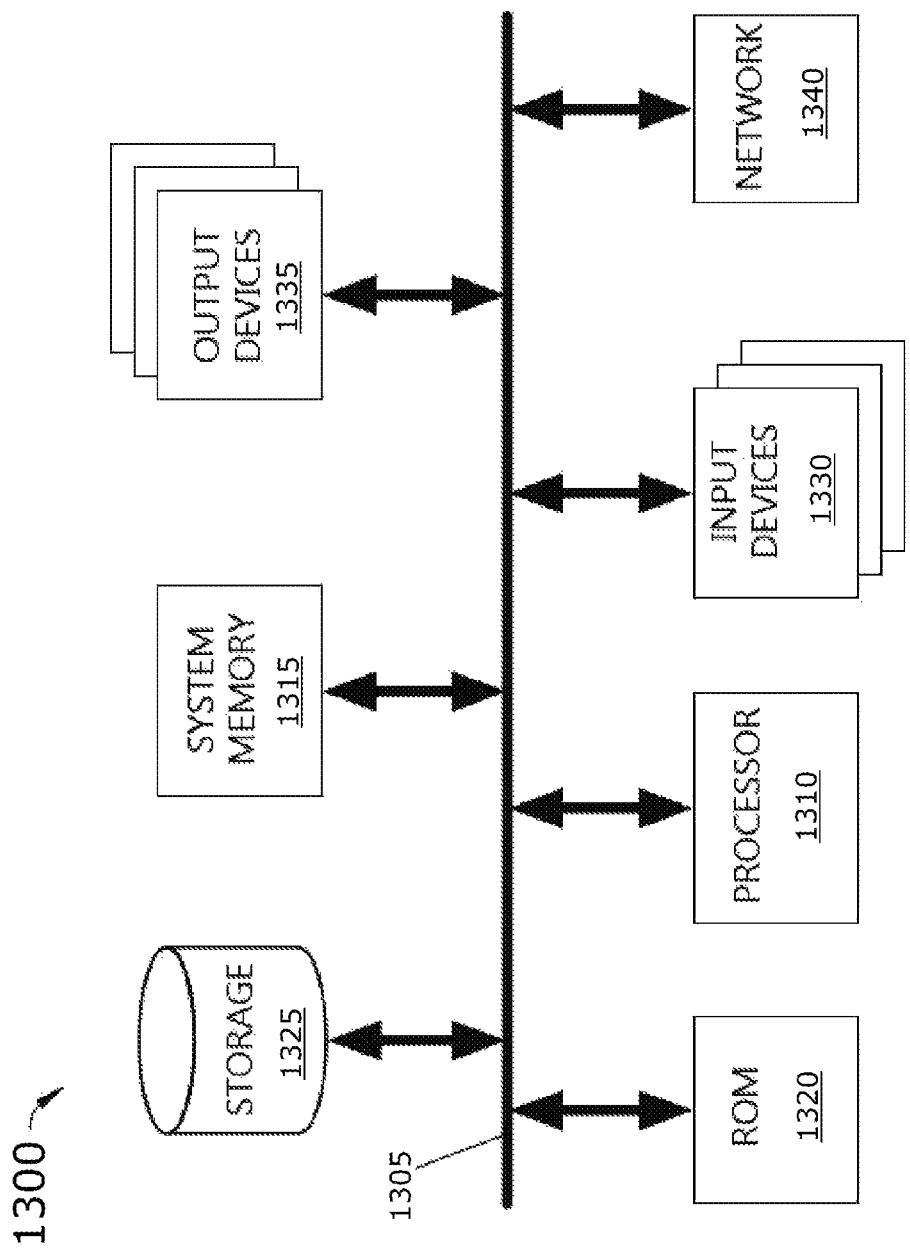
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer, a mobile computing device, a tablet computing device, a smartphone, a web server, a cloud server that hosts a cloud application service for access to connecting mobile devices or other computing devices, and associated database management system devices, such as may communicably connect to cloud database storages for management of child social networking data in a secure, encrypted, and fail-safe manner. Such an electronic system includes various types of computer readable media and interfaces for various other types of computer readable media. Electronic system 1300 includes a bus 1305, processing unit(s) 1310, a system memory 1315, a read-only memory 1320, a permanent storage device 1325, input devices 1330, output devices 1335, and a network 1340.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1320, the system memory 1315, and the permanent storage device 1325.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1320 stores static data and instructions that are needed by the processing unit(s) 1310 and other modules of the electronic system. The permanent storage device 1325, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1325.

Other embodiments use a removable storage device (such as a flash drive) as the permanent storage device 1325. Like the permanent storage device 1325, the system memory 1315 is a read-and-write memory device. However, unlike storage device 1325, the system memory 1315 is a volatile read-and-write memory, such as a random access memory.

The system memory 1315 stores some of the instructions and data that the processor needs at runtime. In some embodiments, the invention's processes are stored in the system memory 1315, the permanent storage device 1325, and/or the read-only memory 1320. From these various memory units, the processing unit(s) 1310 retrieves instructions to execute and data to process in order to execute the processes of some embodiments.

The bus 1305 also connects to the input and output devices 1330 and 1335. The input devices enable the user to communicate information and select commands to the electronic system. The input devices 1330 include alphanumeric keyboards and pointing devices (also called "cursor control devices"). The output devices 1335 display images generated by the electronic system 1300. The output devices 1335 include printers and display devices, such as a liquid crystal display (LCD) or an organic light emitting diode (OLED) display. Some embodiments include input/output devices such as a touchscreen, which functions as both an input device and an output device.

Finally, as shown in FIG. 13, bus 1305 also couples electronic system 1300 to a network 1340 through a network adapter (not shown). In this manner, the computer can be a part of a network of computers (such as a local area network ("LAN"), a wide area network ("WAN"), or an intranet), or a network of networks (such as the Internet). Any or all components of electronic system 1300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks. Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a program that is executable by a processing unit and includes sets of instructions for performing various operations. Examples of programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1A-1C conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A mobile application-implemented method for accessing and using a secure and safe child social networking and parental oversight system, said mobile application-implemented method comprising:

signing up in a secure and safe child social networking and parental oversight mobile application as the child user of a secure and safe child social networking and parental oversight system;

signing up in the secure and safe child social networking and parental oversight mobile application as a parent user of the secure and safe child social networking and parental oversight system, wherein the parent user is related to the child user and the secure and safe child social networking and parental oversight system requires dual login of the child user and the parent user;

setting up a profile for the child user by parent selection of an approval option;

enabling a child interface of the secure and safe child social networking and parental oversight mobile application for the child user;

enabling parent override control of the child interface by way of a parent interface of the secure and safe child social networking and parental oversight mobile application for the parent user;

creating prerequisite responsibilities by the parent user for the child user to complete, wherein the creating prerequisite responsibilities by the parent user for the child user to complete triggers a prerequisite responsibility engine to lock features of the secure and safe child social networking and parental oversight mobile application until the prerequisite responsibilities are completed by the child user;

finding and connecting with friends of the child user upon approved consent of the parent user for the child user and a corresponding parent user of each friend;

using social networking tools of the secure and safe child social networking and parental oversight mobile application, upon completion of the prerequisite responsibilities by the child user, to post comments, photos, videos, and events based on settings made by the parent user to allow access to the social networking tools;

logging all posted comments, photos, videos, and events;

accessing, by the child user and upon approved consent of the parent user, features of the social networking tools for photos, feelings, check-ins, and animations, wherein the features of the social networking tools provide access to (i) a camera of a mobile device on which the secure and safe child social networking and parental oversight mobile application is operating for still images and videos, (ii) a tag tool that is configured to allow tagging of friends and siblings, (iii) an academics view to access academics, (iv) a health view, (v) a sports view, (vi) creativity items, and (vii) location and event tools;

receiving notifications from connected friend users by the child user upon approved consent of the parent user;

creating events by the parent user to invite one or more friend user connected to the child user;

toggling, by the parent user, a setting for audio phone calls to either allow or block phone calls for the child user;

tracking a location of the child user and the connected friend users; and updating, by the parent user, any of several child user settings to manage resources available to the child user over the secure and safe child social networking and parental oversight system for children.

2. The mobile application-implemented method of claim 1, wherein the secure and safe child social networking and parental oversight system comprises a parent approval gateway manager that is configured to require the dual login of the child user and the parent user.

3. The mobile application-implemented method of claim 2, wherein the parent selection of the approval option is required by the parent approval gateway manager for public posting of the profile for the child user.

4. The mobile application-implemented method of claim 1, wherein the posted comments, photos, videos, and events are logged by a content logging service.

5. The mobile application-implemented method of claim 1, wherein the completion of the prerequisite responsibilities by the child user triggers the prerequisite responsibility engine to unlock the features of the secure and safe child social networking and parental oversight mobile application.

6. The mobile application-implemented method of claim 1, wherein the parent override control of the child interface enables the parent user to interact with the child interface of the secure and safe child social networking and parental oversight mobile application as visually output on a screen of the mobile device used by the child user.

7. The mobile application-implemented method of claim 6, wherein the parent override control of the child interface enables the parent user to remove photos, videos, and other content visible to the child user via the child interface of the secure and safe child social networking and parental oversight mobile application.

8. The mobile application-implemented method of claim 7, wherein the parent override control enables the parent user to remove photos, videos, and other content posted by the child user using the social networking tools of the secure and safe child social networking and parental oversight mobile application.

\* \* \* \* \*